US008578043B2

(12) United States Patent
Cuesta et al.

(10) Patent No.: US 8,578,043 B2
(45) Date of Patent: Nov. 5, 2013

(54) METHOD AND APPARATUS FOR DATA BROADCAST

(75) Inventors: Daniel Cirujano Cuesta, Munich (DE); Ouelid Abdesselem, Toulouse (FR); Faouzy Soilihi, Toulouse (FR)

(73) Assignee: Motorola Mobility LLC, Libertyville, IL (US)

( * ) Notice: Subject to any disclaimer, the term of this patent is extended or adjusted under 35 U.S.C. 154(b) by 222 days.

(21) Appl. No.: 12/746,812

(22) PCT Filed: Dec. 16, 2008

(86) PCT No.: PCT/US2008/086937

§ 371 (c)(1), (2), (4) Date: Oct. 25, 2010

(87) PCT Pub. No.: WO2009/088662

PCT Pub. Date: Jul. 16, 2009

(65) Prior Publication Data

US 2011/0055415 A1 Mar. 3, 2011

(30) Foreign Application Priority Data

Dec. 31, 2007 (EP) .................................... 07305011

(51) Int. Cl.
*G06F 15/16* (2006.01)

(52) U.S. Cl.
USPC .......................................................... 709/231

(58) Field of Classification Search
USPC .................. 709/223–224, 230–235, 217–219
See application file for complete search history.

(56) References Cited

U.S. PATENT DOCUMENTS

| | | | | |
|---|---|---|---|---|
| 7,975,283 | B2 * | 7/2011 | Bedingfield, Sr. | 725/95 |
| 8,104,054 | B2 * | 1/2012 | Weaver et al. | 725/14 |
| 8,331,432 | B2 * | 12/2012 | Matsubayashi | 375/240 |
| 2003/0142213 | A1 * | 7/2003 | Ali et al. | 348/180 |
| 2004/0148555 | A1 | 7/2004 | Blackburn et al. | |
| 2004/0153951 | A1 | 8/2004 | Walker et al. | |

(Continued)

FOREIGN PATENT DOCUMENTS

| | | | |
|---|---|---|---|
| EP | 1871027 | A2 | 12/2007 |
| WO | 0014967 | | 3/2000 |
| WO | 2006134516 | A1 | 12/2006 |

OTHER PUBLICATIONS

Mok, Seung Kyun: "The International Search Report and the Written Opinion of the International Searching Authority, or the Declaration", Korean Intellectual Property Office, Daejeon, Republic of Korea, completed: Jul. 27, 2009, mailed: Jul. 28, 2009, all pages.

(Continued)

*Primary Examiner* — Brendan Higa
(74) *Attorney, Agent, or Firm* — Gary J. Cunningham

(57) ABSTRACT

A wireless communication device for presenting alternative media during an out of signal condition is disclosed. The device comprising a receiver configured to receive a primary media stream. A memory coupled to the receiver to store a secondary media. A user interface to output one of the primary media stream and the secondary media stream. A detector module that detects when a first predetermined characteristic has been met, the characteristic preventing the output of the primary media stream received from the broadcast transmitter. A media selector module that selects between the primary media stream from the receiver and the secondary media from the memory in response to the detector module detecting that the first predetermined device characteristic has been met.

12 Claims, 4 Drawing Sheets

(56) References Cited

U.S. PATENT DOCUMENTS

| | | | | |
|---|---|---|---|---|
| 2004/0186877 | A1 | 9/2004 | Wang et al. | |
| 2004/0203698 | A1* | 10/2004 | Comp | 455/421 |
| 2005/0024543 | A1* | 2/2005 | Ramaswamy et al. | 348/723 |
| 2005/0246417 | A1 | 11/2005 | Raith et al. | |
| 2005/0262257 | A1* | 11/2005 | Major et al. | 709/231 |
| 2006/0015908 | A1 | 1/2006 | Vermola et al. | |
| 2007/0190928 | A1 | 8/2007 | Nichols et al. | |
| 2007/0294721 | A1* | 12/2007 | Haeuser et al. | 725/34 |
| 2008/0320158 | A1* | 12/2008 | Simonds | 709/231 |
| 2009/0204719 | A1* | 8/2009 | Simongini et al. | 709/231 |

OTHER PUBLICATIONS

Willems, Bridgitte: “Communication”, European Search Report, European Patent Office, Munich, Germany, Apr. 16, 2008, all pages.

* cited by examiner

METHOD AND APPARATUS FOR DATA BROADCAST

TECHNICAL FIELD

This invention relates generally to streaming media and more particularly to presenting a secondary media that is alternative to the primary media.

BACKGROUND

Streaming media is generally delivered to remote devices and presented on a user interface. The remote devices will present the media as it is received in "real time" or at least near real time as some buffering may be required. However, the buffer size may not have the capacity to accommodate gaps in the streamed media to due reception failure or degradation. For example, the signal may be lost when the remote device moves into a tunnel or may be traveling though variable terrain such as mountains. As a result there is a gap in the presentation of the media which is undesirable for the user.

Because the steaming media is generally broadcast to a plurality of remote devices, the media is not replayed to accommodate one device that experienced reception problems. One solution for video streaming is to present, in freeze frame fashion, a still image of the last good frame received until the streamed media can be resumed. This however still provides a glitch in the presentation of the media. Further, one method for handling poor reception of streaming media is to terminate the media player software requiring the user to restart the application.

Therefore, a better solution is necessary to provide continuous uninterrupted media to the user

BRIEF DESCRIPTION OF THE DRAWINGS

The above needs are at least partially met through provision of the method and apparatus for broadcasting streaming media documents described in the following detailed description, particularly when studied in conjunction with the drawings, wherein.

Figure 1:
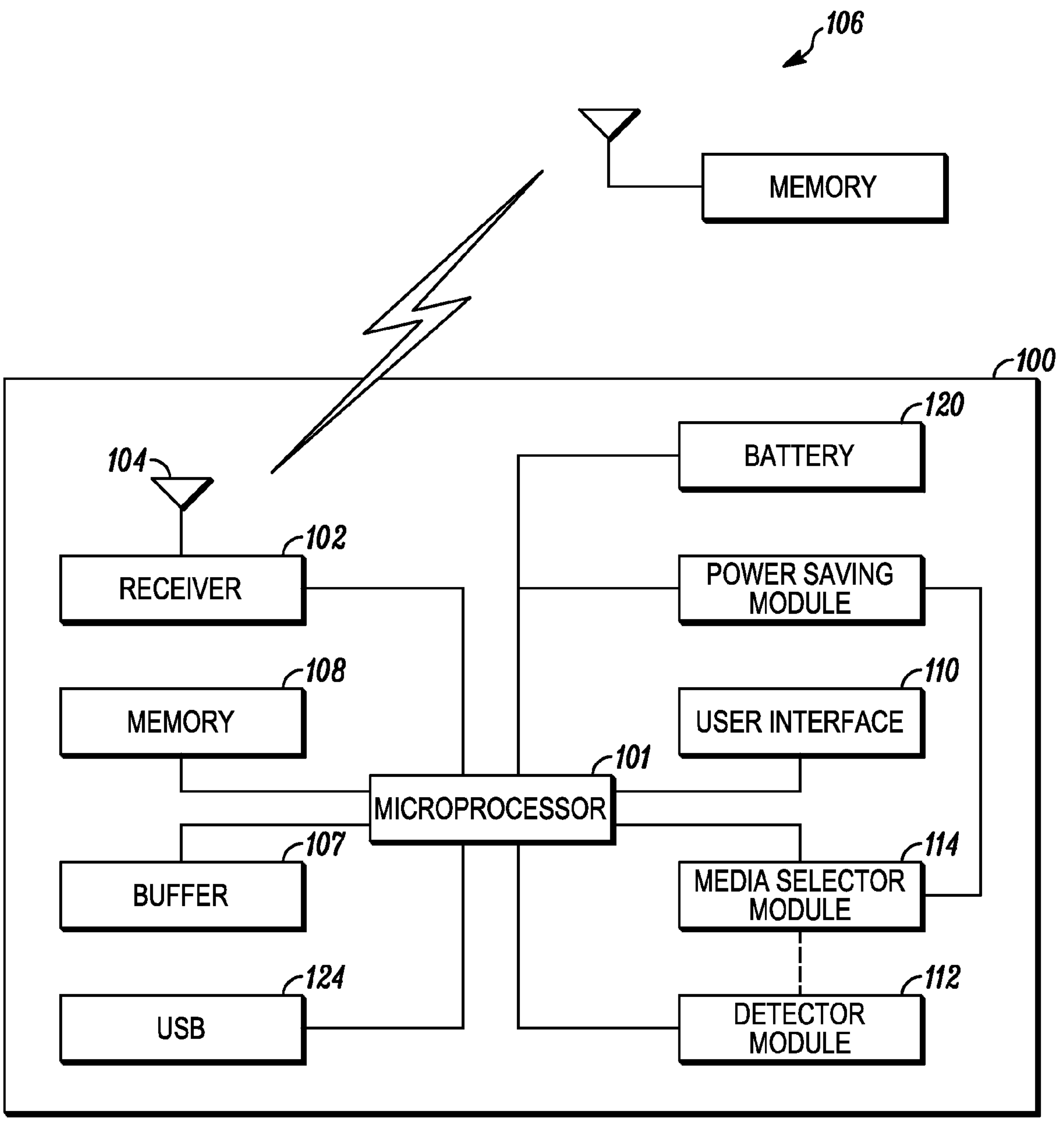
FIG. 1 comprises a representation of a block diagram for a device that receives streaming media.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

A method and apparatus for presenting alternative media in response to an interrupted presentation of a primary media stream is disclosed.

In one embodiment, a primary media stream and a secondary media are received at the remote device as a bundled package. The primary media stream is presented on the remote device. The secondary media is stored in a memory of the device. When the strength of the media stream signal degrades to a point that the rendering of the presentation is not possible, the secondary media is played from memory, as an alternative to the primary media stream until the signal strength of the primary media stream improves.

In an alternate embodiment, a primary media stream is received at the remote device. The secondary media has been previously stored on the device either through a wired or a wireless connection. The primary media stream is presented on the remote device. When the loss of signal occurs, the alternative secondary media is presented on the user interface from the stored memory.

One advantage of previously storing the secondary media is that uninterrupted content can be provided to the user. Whether the secondary media is video, animated graphics or alternative media in general such as audio (when the primary stream is video) the presentation is continuous to the user.

Another advantage is that the power consumption may be reduced while the alternative secondary media is being presented.

Yet another advantage is the user experience is enhanced with rich content that is not available with typical broadcast media. For example, replays of the current streaming g media may be replayed to the user thereby enhancing the media that is typically just streamed to the device. Another example, may be that certain portions of the streamed media may be presented from a different angle by way of the secondary media. In yet another example more information regarding the players or actors, such as bios may be presented or called up from the secondary media.

These and other benefits may become clearer upon making a thorough review and study of the following detailed description.

Referring now to the drawings, and in particular to FIG. 1, a block diagram of a remote device 100, such as a wireless communication device for receiving streaming media is illustrated. The device 100 includes a microprocessor 101 and a receiver 102, coupled to the microprocessor 101, the receiver 102 configured to receive a primary media stream via an antenna 104; the primary media stream is transmitted to the device 100 from a wireless communication system 106 for example. In this embodiment, the wireless communication system 106 is a digital video broadcast handheld DBV-H broadcast system. The device also comprises a buffer 107 (i.e. a short term memory) that is coupled to the receiver 102 to buffer the primary media stream as it is received prior to presentation. The primary media is then rendered by the microprocessor 101 and formatted for presentation on a user interface 110 to the user. The user interface 110 is coupled to the buffer 107 and the microprocessor 101.

The device 100 further includes a memory 108 to store a secondary media file. The memory 108 in one embodiment is coupled to the receiver 102 to receive the secondary media transmitted from the wireless communication system 106. The user interface 110 is coupled to the memory 108 to present the secondary media stream. The memory may be a single memory that is partitioned for example wherein a portion of the memory is a buffer and another portion is for storing the secondary media. The memory may be removable memory such as a memory card or a USB memory drive in yet another embodiment.

The device 100 also comprises a detector module 112 that detects when a first predetermined device characteristic has been met, the characteristic preventing the rendering and subsequent output of the primary media on the user interface 110 as received from the broadcast transmitter 106. A media selector module 114 is coupled to the detector module 112 and coupled to the user interface 110; the media selector module 114 for selecting between the primary media stream from the receiver and the secondary media from the memory 108. The media selector 114 operates in response to the detector module 112 detecting that the first predetermined device characteristic has been met. In one embodiment the secondary media is streaming concurrently with the primary media however on a different channel. In yet another embodiment the device 100 stores portions of the primary media stream in the memory 108 for playback later as a secondary media.

In one embodiment, the device 100 determines the out of signal condition when the signal strength of the primary media stream is below a predetermined signal strength threshold. The device 100 determines that the signal of primary media stream has improved above the predetermined threshold and the device switches back to the primary media stream. The detector module 112 continuously monitors the signal strength of the primary media stream broadcast signal in order to determine when the device 100 can switch back to presenting on the user interface 110 the primary media stream.

A power source which is a battery 120 in this exemplary embodiment, is used to supply power to all of the circuitry of the device 100. An alternative power saving module 122 is coupled to the microprocessor 101 and the detector module. The alternative power saving module 122 may be a hardware module or a software module. The alternative power saving module 122 is coupled to the media selector module 114 in one embodiment.

It is to be understood that the modules described herein may be standalone modules or may be incorporated in to the microprocessor 101.

The primary media is streamed to the device 100 by a broadcast transmitter in one embodiment. The secondary media may be streaming to the memory 108 or may be media that has been previously transmitted to the device and stored. In either case, the secondary media is presented on the user interface 110 in a non-real time fashion as an alternative to the primary media stream.

In one embodiment, the primary and the secondary media are streamed to the remote device 100 simultaneously. This may be carried out by transmitting the primary media stream by one transmitter and the secondary media by a second transmitter.

In an alternative embodiment, the device 100 includes a port to connect the device 100 to a second device such as a PC though a cable. For example, the device 100 may have a USB port 124. The secondary media may be received from the PC over the USB cable to the device 100 and stored in the device memory 108.

Figure 2:
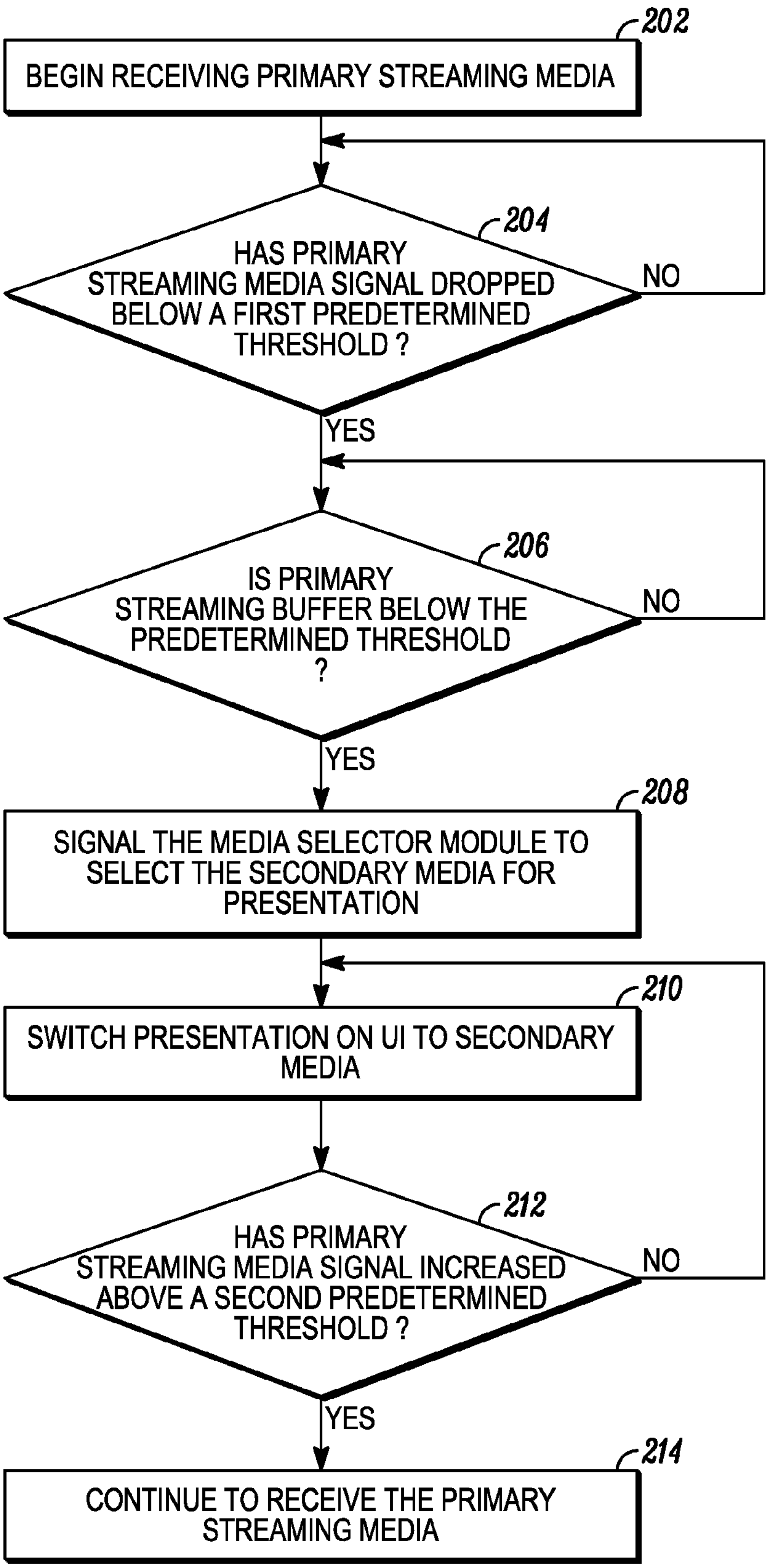
FIG. 2 comprises a flow diagram that illustrates an example of a method for presenting alternative media to a primary media stream.

Referring now to FIG. 2, a flow diagram illustrates one example of a method for presenting alternative media during a lapse in the primary streaming media. In this embodiment the lapse in the data streaming is due to the loss or degradation of the broadcast signal 101 to the remote station 100. The remote device 100 begins 202 to receive or will already be receiving streaming media from the broadcast wireless communication system 106. The remotes device 100 periodically monitors the strength of the streaming media signal 103, or an associated signal that is determinative or predictive of the signal quality, such as a carrier signal, messaging signal, control channel signal or the like. One of ordinary skill in the art will understand that wireless communication devices monitor and measure signal strength by various means. For example, one method is to measure the signal to noise ratio (S/N). In another embodiment, commonly used for digital wireless communication systems, a measurement of the ration of energy per Bit to the spectral noise density $Eb/N_0$ is used to determinate quality of the signal 103. The device 100 determines 204 if the measured signal strength 101 drops below a first predetermined threshold, a first signal strength threshold in this embodiment.

In this embodiment, the signal strength is communicated to the detector module 112 and the detector module determines when a first predetermined device characteristic has been met, the characteristic preventing the output of the primary media stream received from the broadcast transmitter. In one embodiment the detector module determines when the primary media stream can not be rendered (or will soon not be able to be rendered) as a result of poor reception of the primary media streaming signal (based in part on signal strength) and the lack of primary media remaining in the buffer 107. In this embodiment, this is represented in the flow diagram at blocks 204 and 206. The detector module 112 first determines 204 if the signal strength falls below a first predetermined threshold. Then the detector module 112 determines 206 whether the amount of streamed media stored in the buffer is above or below the buffered data threshold.

If the signal strength is below the first predetermined threshold and the amount of buffered primary streaming data is below a second predetermined threshold, then the detector module will signal 208 to the media selector module to select an alternative media to present to the user until the primary media stream can be presented on the user interface 110. If the signal strength falls below the predetermined threshold and the detector module determines that the amount of streamed primary media is not below the predetermined stored secondary media in the buffer, the detector module determines that the primary media will continue to be presented, at least until the amount of primary media remains in above the threshold in the buffer.

In response to the signal to select alternative media, the media selector module switches 210 the presentation on the user interface 110 to present the secondary media that is bundled with the primary media. The detector module 112 monitors the signal strength of the primary media stream and determines 212 whether the signal has increased above a second predetermined threshold. If the signal has increased above the threshold, then the media selector module 114 is signaled to switch back to continue presenting 214 the primary streaming media on the user interface.

In one embodiment, the average signal strength may be used as the actual measure signal strength may vary too much over a short period of time. Those of ordinary skill in the art will understand the plurality of methods to determine the signal strength.

The association of the secondary media to the primary media may occur on several levels. The system level is where the mechanics of getting the media to the end user occurs, i.e. the process flow, the radio frequency channels and the like. At this level, configuration files instruct which secondary media file (or files) is associated with the primary media as well had how they are related. Additionally, the configuration files instruct the network (106) and the receiving device 100 that the primary media content will be delivered, the primary media on a first channel and the secondary media will be delivered on a second channel, for example. In this embodiment, the secondary media is "bundled" or associated with the primary media stream in a description of service configuration file.

At the presentation level, the user may or may not be aware that the services (i.e. the media content) are "bundled." The user may simply choose, in one embodiment, to watch the Chicago Cubs prevail in the World Series base ball game for example and automatically receive secondary media files that include instant replays, player bios, other statistics and the like. In another embodiment the user may be able to choose which services are bundled together. For example, selecting a primary media and then selecting one secondary media option only, such as the replays option; or instead the play bio service.

At the system level, one system, the DVB-H system, has a configuration file called an Electronic Service Guide (ESG) data model. The ESG is transmitted to the device so that the device 100 can configure according to the ESG data model. In this embodiment, a bundling (or binding) attribute in the ESG data model describes the associating of the different service components together (i.e. the primary media streams and an associated alternative or secondary media for example) for a DVB-H broadcast. In one embodiment, the ESG data model specifies a Service Bundle Fragment in order to group services. The grouping can be used to bind certain purchase information to the group or to add information to the services in the context of the group (e.g. service number). This notion of a bundle is primarily commercial and allows service providers to offer service packages such as 'sport service bundle', 'cinema service bundle', or the like.

The ESG data model may also define a 'Component' (data type) which describes the media components (audio, video, download) of a given service. In the 'ComponentCharacteristic' fields of the ESG, a 'purpose' attribute defines or signals the purpose of a given service component in the context of the service. At least one of the services supported in the bundle would have a "purpose" attribute associate therewith to identify its relationship or purpose in the bundle. (e.g. whether it is a primary media stream or a secondary media or that the secondary media stream is associated with an out-of-signal condition of the primary media stream). Therefore, the bundling attribute may bundle two or more services together. Each of the services may or may not have its own purpose attribute indicating the purpose of the service. A Service may be, but is not limited to, broadcast services, content such as media files, and the like.

Currently, the relationship between the services of a bundle is a collection of associated service or components, i.e. all services have the same status in the bundle, without any notion of hierarchy or dependency, and are referred to as 'peer services'. In this embodiment of the ESG data model, the service bundle fragment is applied to services in addition to peer services. The ESG data mode comprises a service dependency attribute, "ServiceDependencyType" attribute for example. Sub elements of the service dependency attribute describe the specifics about the services. For example, the ESG data mode in this embodiment may attribute elements of a "servcieBundleName," ServiceBundlepProvider," "ServiceBundleMediaTitle," "ServiceBundleDescription," "ServiceBundleGenre," ServiceRef," ServiceDependency," "ParentalGuidance," RelatedMaterial," and "serviceBundleID" for example. A portion of one example of an ESG data model maybe as follows:

```
<complexType name="ServiceBundleType">
<sequence>
<element name="ServiceBundleName" type="mpeg7:TextualType"
maxOccurs="unbounded"/>
<element name="ServiceBundleProvider" type="esg:ProviderType"
minOccurs="0"/>
<element name="ServiceBundleMediaTitle"
type="mpeg7:TitleMediaType" minOccurs="0"/>
<element name="ServiceBundleDescription" type=
"mpeg7:TextualType" minOccurs="0"
maxOccurs="unbounded"/>
<element name="ServiceBundleGenre" type="tva:GenreType"
minOccurs="0" maxOccurs="unbounded"/>
<element name="ServiceRef" type="esg:ServiceRefType"
minOccurs="0" maxOccurs="unbounded"/>
<element name="ServiceDependency" type=
"esg:ServiceDependencyType" minOccurs="0"
maxOccurs="unbounded"/>
<element name="ParentalGuidance" type=
"mpeg7:ParentalGuidanceType" minOccurs="0"
maxOccurs="unbounded"/>
<element name="RelatedMaterial" type="esg:RelatedMaterialType"
minOccurs="0" maxOccurs="unbounded"/>
</sequence>
<attribute name="serviceBundleID" type="anyURI" use="required"/>
</complexType>
```

This Service dependency attribute of the ESG data model, specifies the status of a given service with the 'ServiceRep' attribute in the service bundle. The value of the ServiceRep may be Peer, Main, or out-of-signal for example. A value of peer would indicate that the service has not particular status in the bundle. A value of 'main' indicates that service is the main service of the bundle. A value of out-of-signal indicates that the service is to be used as a subsidiary (i.e. secondary) service in place of the main service in an out of signal condition.

In another embodiment, the ESG data model may include a value in the 'purpose' field of the ComponentCharacteristc. The purpose field in this embodiment has a value equal to "out-of-signal." This indicates to the receiving device that the service is intended to be used during the out-of-signal condition of the device.

The origination or source of the service or components of the service may be the same or may be different. For example, in this embodiment, the secondary media may be transmitted to the device 100 concurrently from a second transmitter, different from the first transmitter of the primary media. The source may be indicated by the sub element attribute of ServiceBundleProvider introduced above.

The bundled secondary media is transmitted from the broadcast wireless communication system to be played in the event that the primary media stream can not be presented to the user, in this embodiment, this is due to the loss of signal at the device 100 of the primary streaming media. The type of bundled media for example may include a soccer match as a primary media stream and player biography (player bio) as secondary media. When the primary streaming media signal is lost or degraded, the device presents one of the player bios of the bundled package. The media selector could have instructions sent to it along with the media bundle, as instructed by the ESG data model or in another embodiment, the media selector 114 can randomly select as a default which alternative secondary media to play.

In one embodiment, a tag or set of tags are sent as part of the bundled package and the device stores in memory 108, the tagged media from the primary data stream. The tags point to when the primary streaming media should be stored in memory for later use. For example, in the soccer match discussed above, tags are sent indicating that the streaming media from tag one to tag two is the video of a goal being scored. The goal being stored in the memory, which was also played as the primary streaming media, is not the secondary media to be played at a later time as determined by the detector module 112 and the media selector module 114. The tags may be a time code or time code set (beginning time and ending time) that is associated with the video of the primary media stream. The video between the time codes would be stored in the memory for playback. In one embodiment the secondary media stored based on the tags would be stored in a first in first out method. The secondary may be played based on the FIFO method, randomly or by a priority sent with the tags. A priority for the video of the last goal played would be higher than a player bio for example.

In another embodiment there secondary media is sent interlaced with the primary media in contiguous packets of data. In this embodiment the secondary media is tagged such that the receiver can identify the secondary media packets as they are received and then subsequently store the secondary media.

In yet another embodiment, the secondary media may be sent previous to the broadcast the primary media stream. For example, the user may sign up to receive the bundled package at an internet web site. The secondary media may be sent immediately or at least some time prior to the broadcast of the primary streaming media. If the secondary media is to be sent immediately, the secondary media may be downloaded to a PC and then the user would couple the device 100 with the USB port 124 and store the secondary media in the device memory 108. In another embodiment, the device 100 is used to go to the website and the secondary media is transmitted over the air to the device 100 and stored into the memory 108 at the time.

In one embodiment, wherein the device 100 includes a power saving module 116, the power saving module 116 is coupled to the detector module 112 and the microprocessor 103. When the detector module 112 detects that the signal of the primary streaming media drops below a predetermined threshold, the power saving module 116 will send a signal to the microprocessor 101 to put the device in a reduced power mode during the time the media signal is lost or degraded. In one embodiment, the predetermined threshold is a point at which the primary media stream can not be rendered. (i.e. the rendering process has incurred rendering errors that prevent the presentation of the primary media. For example, an indication that the incoming signal is insufficient may be that the number of packets lost during transmission or not received at the device 100 has dropped below a certain percentage. In one embodiment, the corresponding streaming components and modules of the device are turned sequentially into extreme low power mode leaving the components necessary to present an animation on the display or an announcement to be played over a speaker. In the specific case of Mobile TV over DVB-H, complementary contents associated to a specific program are broadcasted and linked. In this embodiment the reduced power mode allows for the secondary media to be played but does not allow the device to receive the primary media stream.

Figure 3A:
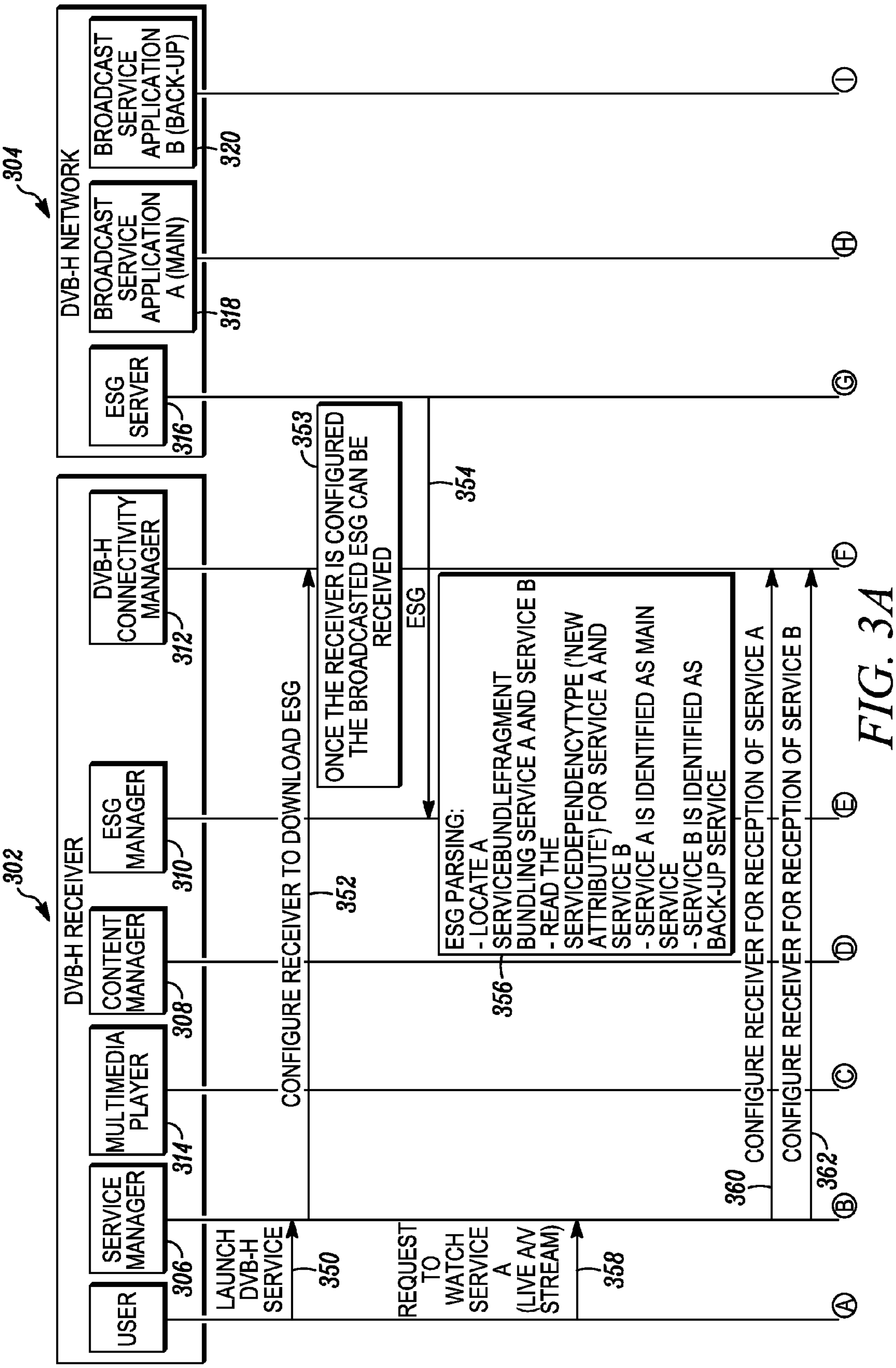
FIG. 3 comprises a ladder diagram illustrating a out of signal secondary media condition.
Figure 3B:
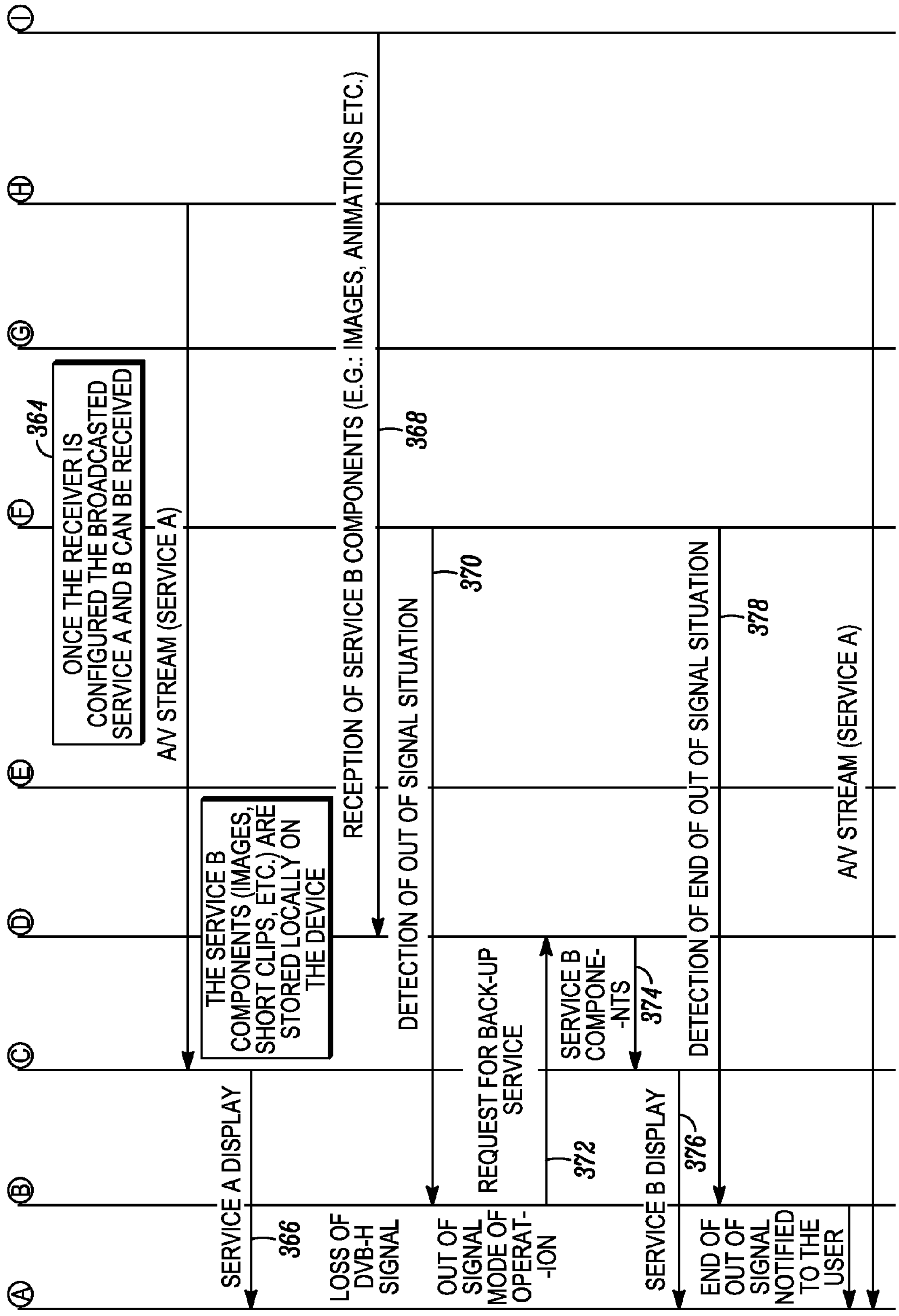

Moving to FIG. 3, a ladder diagram illustrates one example of the out of signal mode of operation. In this embodiment a DVB-H receiver 302 and a DVB-H network 304 are shown. The DVB-H Receiver 302 comprises a Service Manager 306, a Multimedia player 314 a content manager 308 and electronic service guide (ESG) manager 310 and a DVB-H Connectivity manager 312. The DVB-H Network comprises as ESG server 316, a broadcast service application (Main or primary) 318 and at least one Broadcast Service application B (back-up or secondary) 320. In this embodiment he DVB-H network broadcasts services to remote devices or DVB-H receivers 302. The method illustrated in this embodiment comprises the launch of a service is initiated 350. This may be done at the device 302 by the user as shown or the initiation may be done by the device itself or initiated in another embodiment by the network, or yet in another embodiment by another device. The service manager 306 receives the launch initiation and sends a message to the DVB-H connectivity manger 312 to configure the receiver to download the ESG. Once the receiver is configured 353 the ESG can be received 354 by the ESG manager 310. The ESG manager 310 parses the ESG 356 to locate the servicebundlefragement bundling Broadcast Service A and Broadcast Service B. Then reads the servicedependency type to determine in this embodiment that broadcast service A is the primary service and that the Broadcast service B is the secondary service.

A request is sent to the Service Manager 306 in the device. This may be sent at the initiation of the user as in this embodiment or by other means such as automatically in response to receiving and handling (i.e. parsing) of the ESG or a request sent by the network. The service manager 306 sends a request to the DVB-H connectivity manager 312 to configure the receiver of the device 302 for reception of broadcast service A. If, as in this embodiment the device is to receive the Broadcast service from the network 304, the message to configure the receive or receiving Broadcast Service B is also sent to the DVB-H connectivity manger 312. Once the receiver is configured the services may be received. In one embodiment the receiver may complete the configuration to receive Broadcast Service A based on a predetermined time that the service will begin transmission such that the device is configured prior to broadcast reception.

Reception of the Service A 365 begins and is presented by the multimedia player 314 of the device 302 and displayed to the user 366. Service B is also received 368 and the content of Service B are stored in a memory of the device.

Once an out of signal condition occurs, the DVB-H connectivity manager 312 indicates the out-of-signal condition to the service manager 306. The Service Manager 306 requests the secondary service 372 from the content manager. The content manager 308 initiates the playback 374 of the secondary service B by the multimedia player 314 from memory to be displayed to the user 376.

When the signal of broadcast service A improves to a predetermined acceptable level, the DVB-H connectivity manager 312 sends a message to the service manager 306 indicating that the signal level has improved to acceptable predetermined reception level. In one embodiment e service manager 306 can cause a message to be displayed to the user 380 to indicate that the out of signal condition has ended or in another embodiment the broadcast service A resumes and is presented 382 by the multi media player 314 to the user.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A wireless communication device comprising:

a receiver configured to simultaneously receive a primary media stream and a secondary media stream different from the primary media stream in terms of content streamed by the secondary media stream;

a memory coupled to the receiver to store the secondary media;

a user interface including a display to output one of the primary media stream and the secondary media stream;

a processor, configured to operate a wireless communication device, including:

a detector configured to detect when a first predetermined characteristic has been met, the characteristic preventing the output of the primary media stream received from the broadcast transmitter; and a media selector configured to select between the primary media stream from the receiver and the secondary media from the memory in response to the detector detecting that the first predetermined device characteristic has been met.

2. The device of claim 1, wherein the primary media stream and the secondary media are a bundled package received from a single broadcast transmitter.

3. The device of claim 1, further comprising a signal strength meter coupled to the receiver and the detector module, the meter measuring the signal strength and the meter generating an out of signal condition indication.

4. The device of claim 3, wherein the detector module is coupled to a service manager to send the out of signal condition from the detector module to the service manager.

5. The device of claim 1, further comprising a power control module, coupled to the detector module, the power control module having a reduced power mode activated in response to the first predetermined device characteristic being met.

6. A method of receiving bundled broadcast content services comprising:

simultaneously receiving a primary media stream and a secondary media stream, different from the primary media stream in terms of content streamed by the secondary media stream, at a remote station;

detecting a service level change;

providing a buffer configured to temporarily store the received primary media stream and configured to pass the buffered primary media stream to a display, coupled to a receiver of the remote station and a display of the remote station; and switching to the secondary media stream to present on the display, when the signal of the primary media stream is below a predetermined signal threshold, in response to detecting a service level change.

7. The method of claim 6, further comprising determining that the primary media stream signal strength has improved above the predetermined threshold and switching to the primary media content to present on the display.

8. The method of claim 6, wherein the secondary media is broadcast to the device as a bundle with the primary media and not presented until a degraded characteristic has been determined.

9. The method of claim 6, further comprising turning on a lower power consumption mode in response to the service level change.

10. A method for uninterrupted broadcast service comprising:

detecting a loss of a primary streaming media;

determining whether bundled alternative media, simultaneously received with the primary media, is available to present on a display;

selecting the bundled alternative media to present on the display being different from the primary streaming media in terms of content streamed by the bundled alternative media;

determining that the primary streaming media is available in presentable form; and selecting the primary streaming media to present on the display.

11. The method of claim 10, further comprising playing alternative content streamed and stored.

12. The method of claim 10, further determining that the amount of primary streaming media in a buffer of a receiving device is below a predetermined level.

* * * * *